June 6, 1950 W. H. SPEER ET AL 2,510,936
RAKE
Filed Aug. 27, 1946 2 Sheets-Sheet 1
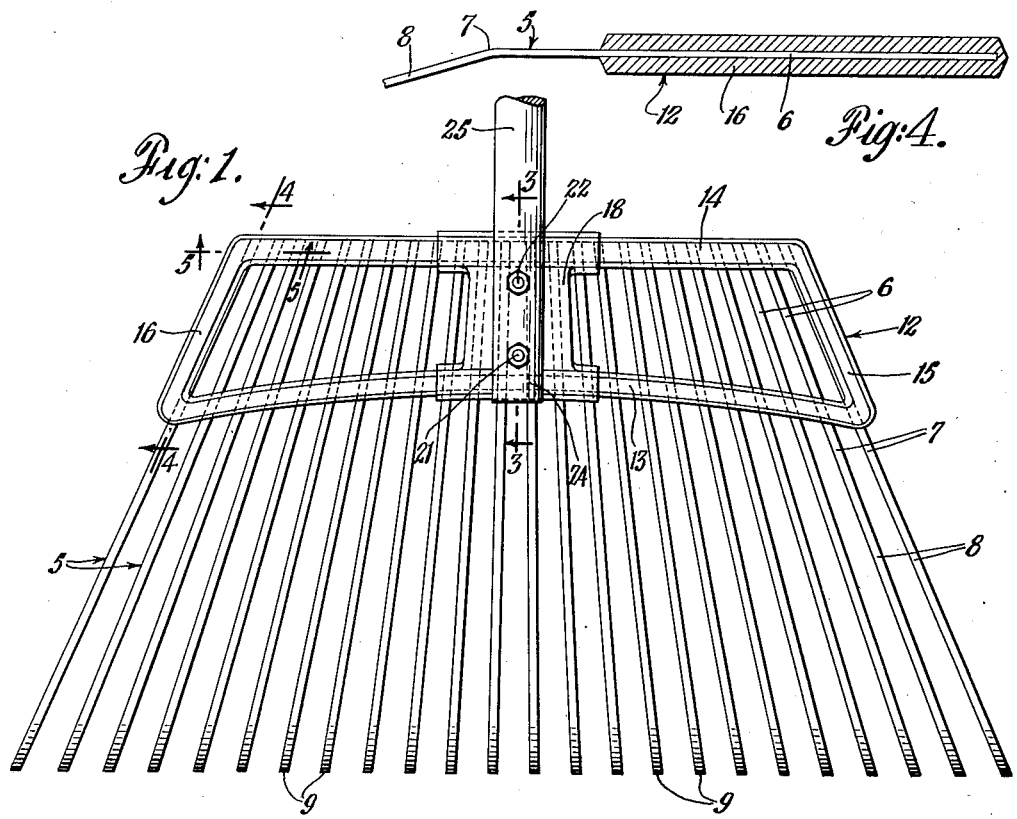
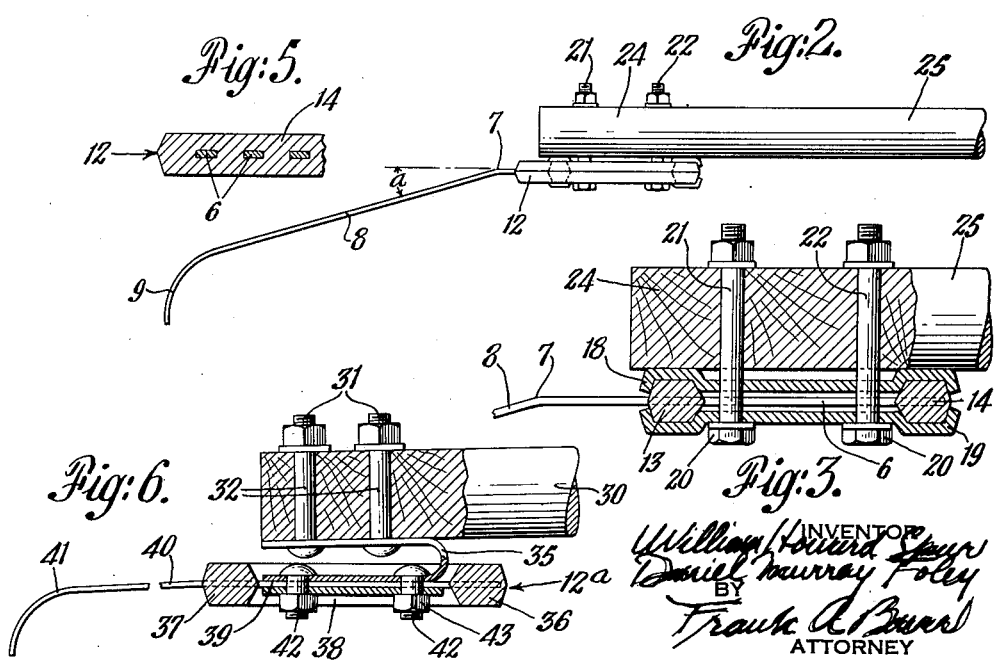
INVENTORS
William Howard Speer
Daniel Murray Foley
BY
Frank A. Burr
ATTORNEY

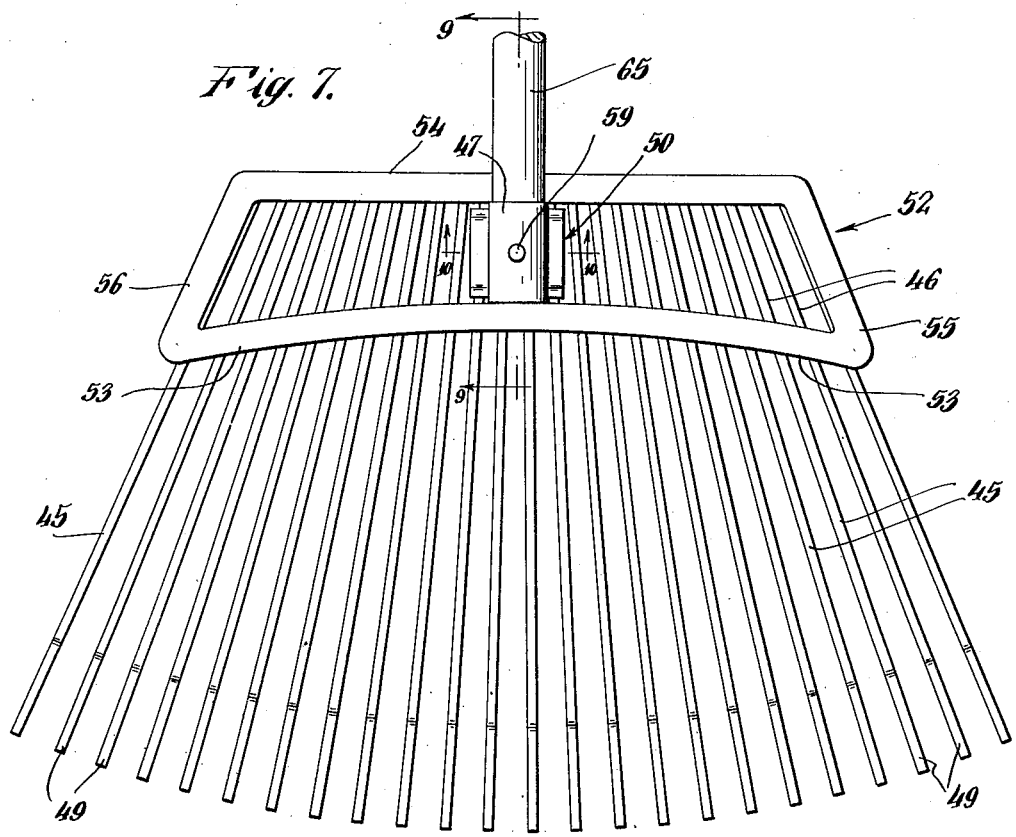
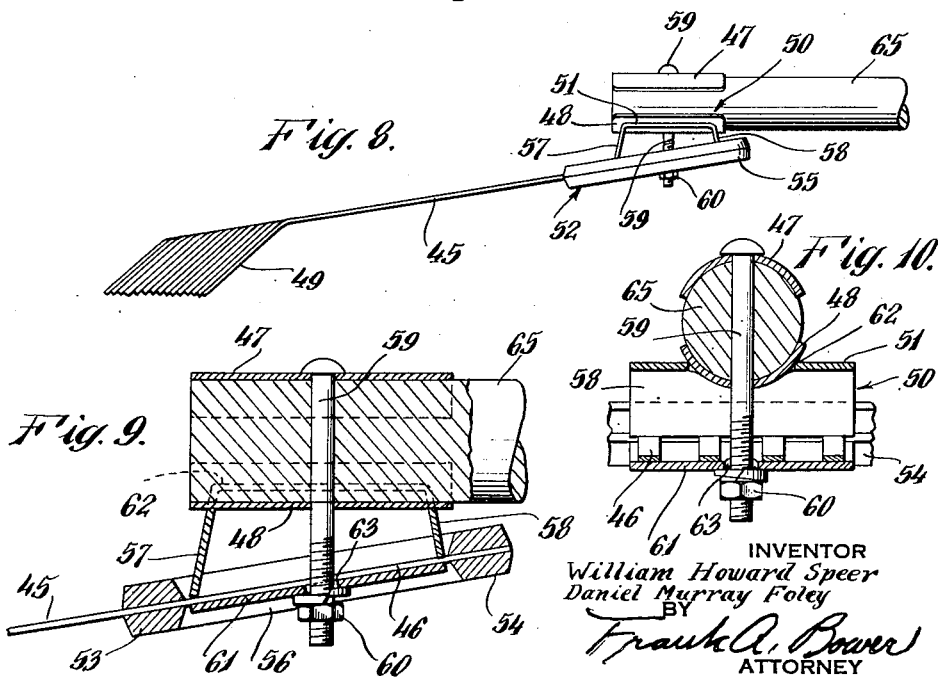
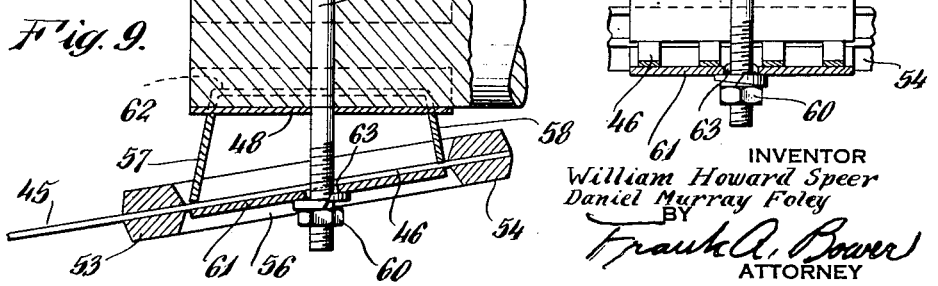

Patented June 6, 1950

2,510,936

UNITED STATES PATENT OFFICE 2,510,936

RAKE

William Howard Speer and Daniel Murray Foley, Moosup, Conn.

Application August 27, 1946, Serial No. 693,279

6 Claims. (Cl. 56—400.17)

This invention relates to rakes and particularly to those having tines in fan formation and extending forward in the general direction of the rake handle.

The object of the invention is to provide such a rake structure having a secure attachment of the tines fastening them as a unit to the handle in desired relation for easy manipulation while at the same time employing a light, simple inexpensive construction of all of the parts.

Further objects of the invention, particularly in supporting the tines as a unit by rigid engagement of the tine roots will appear from the following specification taken in connection with the accompanying drawings in which Fig. 1 is a plan view of the rake;

Fig. 2 is a side view taken from the right of Fig. 1;

Fig. 3 is a partial sectional view taken on the line 3—3 of Fig. 1;

Fig. 4 is a partial sectional view taken on the line 4—4 of Fig. 1;

Fig. 5 is a partial sectional view of a detail along the line 5—5 of Fig. 1;

Fig. 6 is a view similar to Fig. 3 and illustrating a modified form of supporting means;

Fig. 7 is a plan view showing a modified form of rake;

Fig. 8 is a side view of the rake of Fig. 7;

Fig. 9 is a partial sectional view on the line 9—9 of Fig. 7; and

Fig. 10 is a transverse sectional view of the connecting means taken on line 10—10 of Fig. 7.

In the embodiment of the invention shown in Figs. 1 to 6, the tines 5 are in fan formation, each tine being substantially identical to the others and being formed of a flat spring steel having a straight portion 6, a rounded bend 7, an extended straight portion or reach 8 from the intermediate bend 7 to the end curves or claws 9. The roots 6 of the tines are rigidly gripped in a frame 12 having transverse bridge portions 13, 14 and end portions 15 and 16 forming a unitary, integral housing for said roots.

The frame 12 is of material cast or molded to rigidly grip and retain the tine roots 6 and thus form a single structural unit to be attached to the rake handle in any desired manner and with the spreading tines protruding forward at any desired angle to the frame. No bolts or other fastenings are involved in the clamping and retention of the tines in definite form and spacing.

In the embodiment shown, the tine ends 8 are at angles $a$ to the plane of the tine roots 6, and this angle $a$ may be any desired degree from zero to 15 to 20 degrees, the protruding portions of the tines 7, 8, 9 being much longer than the roots 6 held in the frame 7.

This unitary structure gives a very strong and permanent grip of the tine roots holding them securely and rigidly against loosening and dislodgement in service and maintaining them flatwise while permitting flexing and twisting of the protruding portions in use. Each tine is independently flexed in service and all of the tines have substantially the same elasticity yielding under downward pressure to reduce or reverse the angle $a$. The tine roots 6 combine with the frame 12 to provide a very stiff and sturdy base structure adapted to cooperate with central fastening means attaching it to the rake handle.

In use the frame 12 may be parallel to the rake handle as shown so that the angle of the tines relative to the ground will be the angle of the handle plus the angle $a$.

In fastening the frame 12 to the handle the upper and lower plates 18, 19 are provided fitted to the center portion of the frame transverse members 13, 14 so as to rigidly grip the frame between them under the tension of the bolts 21, 22 passing through these adapter plates 18, 19 and between the tine roots 6 and through the end portion 24 of the handle 25.

The tine unit is preferably positioned below the handle 25 as shown lifting the under portion of the frame clear of any obstruction and preserving the full capacity of the tine unit between the frame and the ground.

The adapter plates 18, 19 fitting in the frame 12 are secure against any twisting and shifting, being pressed above by the handle portion 24 and held from below by the nuts 20 of the bolts 21, 22, which in turn securely fasten the adapter plates to the end of the handle.

The entire structure comprises only the handle and the tine unit held together by the adapter plates and bolts, all of simple formation readily assembled and securely fastened together by a simple insertion and tightening of the bolts. The protruding spring ends of the tines always position the rake on the ground with the handle centered and at a desired angle determined by the user. The angle $a$ between the tines and the frame adds to the spacing of the tine unit from the ground with corresponding increase in the capacity of the rake for a given angle of the rake handle. A minimum of parts of material is employed making the structure simple and light with all of the features cooperating to contribute great strength in proportion to the weight of the rake, so that the raking action is easy and resilient, permitting the operator readily to handle it without fatigue. For instance, the frame 12 may be variously formed and composed of cast materials, such as lead, aluminum, or the like, or of a thermoplastic or thermosetting material, such as Lucite, Bakelite, etc.

In the modification shown in Fig. 6, a handle 30 is fastened by bolts 32 and nuts 31 to the U-shaped resilient tie member 35 which in turn is bolted by bolts 42 and nuts 43 to the clamp members 39 above and below the roots of the tines 40 molded in the transverse front and rear frame members 37, 36 joined by the end members 38 and forming the frame 12a. In this structure the resilience of the tines is augmented by that of the curved portion of the tie member 35.

In Figs. 7-10 the rake shown has the molded frame 52 with transverse members 53, 54 and end members 55, 56 molded as a matrix for the roots 46 of the tines 45 having bent ends 49. This structure provides a rake head which is very rigid at the roots and solid and durable in use, the open framework with the roots of the tines extending across between the transverse members 53, 54 providing a strong base for the attachment of the handle.

In this modification, the attaching means to the handle 65 includes a pair of curved plate members 47, 48 with the plate 48 seated in the recess 62 of the saddle portion 50 of the top or bridge portion 51 supported by end pieces 57, 58 in position above the base portion of the rake head 52. A bolt member 59 extends through the handle and the plate members 47, 48 and through the center of the recess 62 of the saddle member and then downward between the tine roots 46 and through the opening 63 of the clamp plate 61 engaging under these tine roots, which at their upper surfaces support the end members 57, 58 of the bridge 51. A nut 60 on the bolt 59 draws these parts together snugly pressing the clamping plate 61 against the lower surfaces of the tine plates with downward pressure of the head of the bolt on the handle and handle plates holding the lower plate in the recess 62 of the bridge 51 and clamping the ends 57, 58 of the bridge member against the upper surfaces of the tine roots 46.

This gives a very secure and rigid fastening of the rake head to the rake handle at any desired angle determined by the relative lengths of the end members 57, 58 and the angles at which they are bent. Adjustment may thus be readily made of the angle of the rake head relative to the handle and the bridge member 51 forms a reverse adapter which may be reversed in position so that its shorter leg 58 is at the end of the handle tipping the rake head upward instead of downward (Fig. 8) and so changing the rake into a type of broom-rake to be used in sweeping rather than in raking.

The solid unitary molded frame very neatly fits the tine roots giving a narrow unobstructive construction. It also provides an integral fixed holding means enabling any desired steel to be used in the tines, and these latter may have their roots notched or roughened to form a secure anchorage in the molding material. There is thus provided a single rake head unit with a rigid arch structure with any desired degree of springiness in the protruding tines. No bolting or other fastening between the tines and the holding base are required and the rake head structure is permanently secure against shifting and against tampering by the user or others in service.

While the invention has been described in connection with a specific embodiment, it is not intended to be limited thereto. A preformed set of tines could be set in place by vulcanizing or fusing of the frame to fasten the whole into an integral rake head. In all structures the rake in use gives an even pressure on the tine tips; and the method of assembly makes the rake head in reality a single piece which cannot rust or corrode between the holding frame and the held tines.

We claim:

1. A rake having a series of tines in generally fan shape rigidly gripped at their roots in an integral molded open frame structure having transverse members joined together by end members in substantially the same plane and engaging the roots of the intermediate tines at separate areas, the ends of the tines protruding resiliently forward from said frame, and a handle structure attached to said frame extending at an angle to the plane of said tines.

2. A rake having a series of tines in generally fan shape rigidly gripped at their roots in an integral molded open frame structure having transverse and end members joined together in substantially the same plane, the ends of the tines protruding resiliently forward from said frame, and a handle structure attached to said frame and having its handle substantially parallel to the plane of said frame.

3. A rake having a series of tines in generally fan shape rigidly gripped at their roots in an integral molded open frame structure having transverse and end members joined together in substantially the same plane, the ends of the tines protruding resiliently forward from said frame, and a handle structure attached to said frame, the protruding ends of said tines being at acute angles to the plane of said frame.

4. A rake having a series of tines in generally fan shape rigidly gripped at their roots in an integral molded open frame structure having transverse and end members joined together in substantially the same plane, the ends of the tines protruding resiliently forward from said frame, and a handle structure attached to said frame, each of said tines comprising a root portion gripped by the frame and curved portion adjacent said frame, a straight portion extending forward from the curved portion and end hook portions curving toward the ground.

5. A rake having a tine unit comprising a rigid frame at the roots of the tines and free resilient tine ends extending forward in fan fashion from said frame, flat members gripping said frame and held together by fastening means, and a handle rigidly held to said fastening means above said plates.

6. A rake having a series of tines in general fan shape converging to roots at a rear frame member positioned approximately half way between the tip ends of the tines and the point of convergence of said tines, a molded open frame structure having transverse members joined together by end members in substantially the same plane and engaging the root portions of said tines at separated areas, the ends of said tines protruding resiliently forward from said frame and a handle structure attached to said frame at an angle thereto and extending at an angle to the plane of said tines.

WILLIAM HOWARD SPEER.
DANIEL MURRAY FOLEY.

REFERENCES CITED

The following references are of record in the file of this patent:

UNITED STATES PATENTS

| Number | Name | Date |
| --- | --- | --- |
| 2,413,827 | Herst | Jan. 7, 1947 |